April 1, 1969 H. E. TAYLOR ET AL 3,435,578
FURNACE WALL CONSTRUCTION
Filed Aug. 24, 1967

INVENTORS
HERBERT E. TAYLOR
DAVID R. PEARL
LAWRENCE S. WOLFSON
BY
Robert L. Olson
ATTORNEY United States Patent Office 3,435,578
Patented Apr. 1, 1969

3,435,578
FURNACE WALL CONSTRUCTION
Herbert E. Taylor, Longmeadow, Mass., and David R. Pearl and Lawrence S. Wolfson, West Hartford, Conn., assignors to Combustion Engineering, Inc., Windsor, Conn., a corporation of Delaware
Filed Aug. 24, 1967, Ser. No. 663,057
Int. Cl. E04b 1/62; E04f 15/14
U.S. Cl. 52—396                                       3 Claims

ABSTRACT OF THE DISCLOSURE

A furnace, the walls of which are constructed of an outer corrugated metal wall, and an inner refractory block wall which is exposed to the furnace interior. The corrugated wall has vertical channel members secured thereto, and the refractory blocks have flanges on each side, which cooperate with the channel members to hold the blocks in place.

Background of the invention

Furnaces and incinerator furnaces for burning refuse in particular are generally lined with a brick or refractory material. Difficulties are sometimes encountered in keeping these walls cool, and also in constructing them so that they are free to move as they expand with heat.

Summary of the invention

The furnace wall of the invention includes an outer corrugated metal wall, and an inner refractory block wall. Vertical channel members secured to the corrugated wall are used to support the refractory blocks in place. The channel members contain a flexible covering, which effects ease of assembly, and also allows slight movement of the blocks due to thermal expansion.

Description of the preferred embodiment

Figure 1:
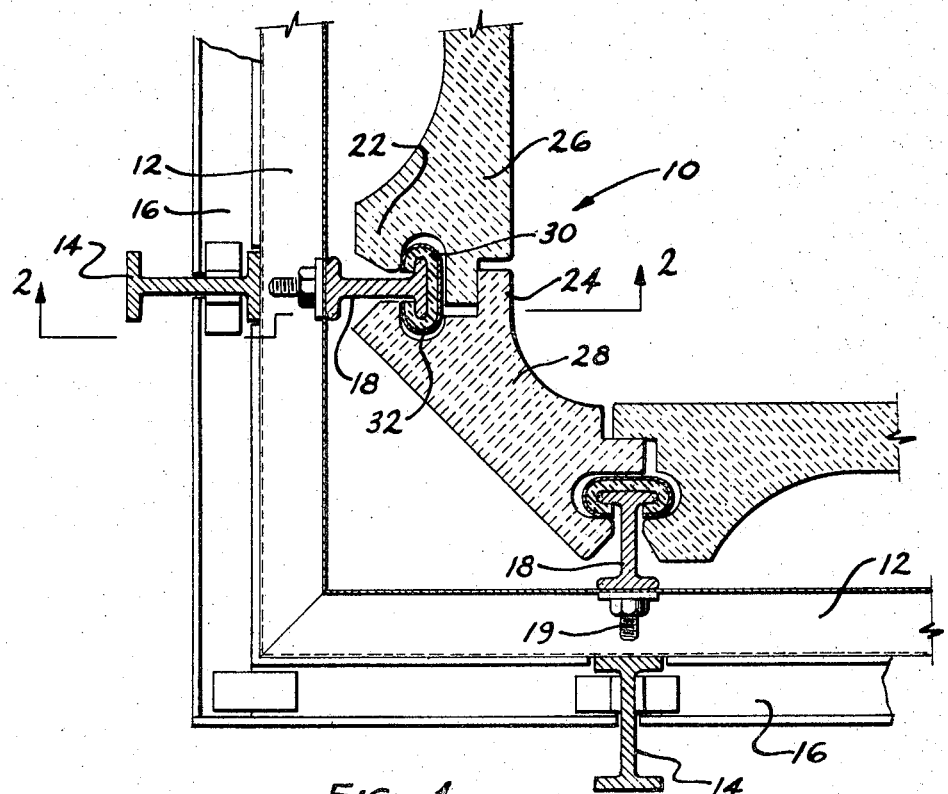
FIGURE 1 is a partial sectional plan view of a furnace wall constructed in accordance with the invention.

Looking now to the drawings, an incinerator furnace wall 10 is shown as having an outer corrugated metal wall 12, which is bolted to and supported by spaced vertical and horizontal I-beams 14 and 16. Vertical channel members 18 are secured to the interior face of corrugated member 12 by means of bolts 19 which are integral with channels 18. These channel members 18 cooperate with flanges 22 of the refractory block or tile members 20 to hold these blocks in place. The blocks are initially slipped into place from above. One side of each block 20 has a flange 24 which overlaps flange 26 of the next adjacent block, thus protecting the metallic channel members 18 from direct exposure to the furnace interior. Corner refractory block members 28 are also supported by channel members 18 and protect the corner joints of the corrugated sheet metal from being exposed to heat radiation from within the furnace.

The channel members 18 are covered with a layer of insulating material, such as asbestos 30. To keep this layer of insulating material in place, there is a sheathing of thin metal 32. The insulating material, which is somewhat flexible and compressible, not only protects the channel members from overheating, but also allows slight movement of the blocks thereon. This makes for ease of initial installation of the blocks within the channel assemblies, and also allows the blocks to expand outwardly in an unrestricted manner due to heat absorption during operation of the furnace.

Figure 2:
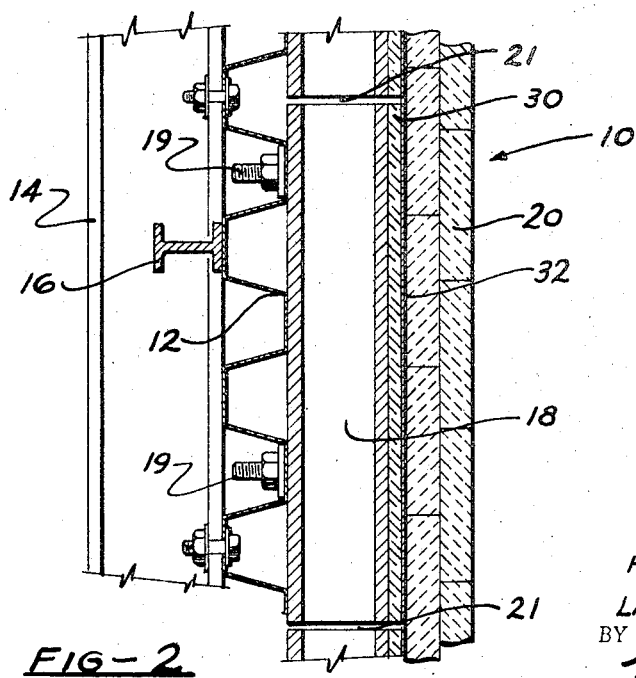
FIGURE 2 is a sectional side view taken on lines 2—2 of FIGURE 1.

As shown in FIGURE 2, each vertical channel is made up of a plurality of members 18, each of which has a slight space 21 between it and the next adjacent member. This allows for expansion of these channel members without creating any undue stresses in the wall structure. To further prevent stresses from being created in the wall, the corrugated sheet metal is bolted to the I-beams at spaced points, there being a number of corrugations between each fastening point. Likewise, the channel members are secured to the corrugated wall at spaced points, with there being free corrugations between each of the fastening points.

Thus it can be seen that each component of the entire wall structure is capable of slight movement relative to the other members that it is fastened to. The corrugations permit flexing of the sheet metal wall between the points where it is attached. In order to keep the wall as cool as possible during operation of the furnace, cooling air or gas is circulated in the space between the corrugated wall and the refractory block wall.

From the above, it can be seen that a furnace wall is provided which can be easily and economically constructed, and the components of which are free to expand due to heat absorption without creating any excessive stresses.

Having now described our invention, what we claim is:
1. A furnace wall construction including, an outer corrugated metal wall, a plurality of vertical metal channel means secured to the inner surface of the corrugated wall, a plurality of refractory blocks positioned between each adjacent pair of channel means, each channel means having flanges extending outwardly on each side thereof, each refractory block having a flange on each side thereof, the flanges of the refractory block being positioned behind the flanges of the channel means, each refractory block containing extending portions along its two side edges which overlap the channel means and completely cover them, so that they are not directly exposed to the furnace interior, each vertical channel means being made up of a plurality of separate, axially aligned channel members, each channel member being slightly spaced from the channel members directly above and below it, so that these members can move freely due to thermal expansion, the flanges of the channel means being covered with a flexible means, there being a metal housing outside of and surrounding the flexible means.
2. The furnace wall construction set forth in claim 1 wherein the flexible means is an insulation material.
3. The furnace wall construction set forth in claim 2 wherein the corrugations of the metal wall extend in a horizontal direction.

References Cited

UNITED STATES PATENTS

| | | | |
|---|---|---|---|
| 1,692,134 | 11/1928 | McKenzie | 52—486 |
| 1,835,873 | 12/1931 | Jacobus | 52—396 |
| 2,321,813 | 6/1943 | Henzel | 52—573 X |

ALFRED C. PERHAM, Primary Examiner.

U.S. Cl. X.R.
52—269, 481, 492